(12) United States Patent
Sogabe

(10) Patent No.: US 10,576,977 B2
(45) Date of Patent: Mar. 3, 2020

(54) VEHICLE DEVICE

(71) Applicant: DENSO CORPORATION, Kariya, Aichi-pref. (JP)

(72) Inventor: Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/083,689

(22) PCT Filed: Feb. 22, 2017

(86) PCT No.: PCT/JP2017/006450
§ 371 (c)(1),
(2) Date: Sep. 10, 2018

(87) PCT Pub. No.: WO2017/159237
PCT Pub. Date: Sep. 21, 2017

(65) Prior Publication Data
US 2019/0084563 A1 Mar. 21, 2019

(30) Foreign Application Priority Data
Mar. 18, 2016 (JP) .................... 2016-055972

(51) Int. Cl.
*B60W 30/12* (2006.01)
*B60W 30/09* (2012.01)
(Continued)

(52) U.S. Cl.
CPC .......... *B60W 30/12* (2013.01); *B60W 30/09* (2013.01); *B60W 30/16* (2013.01); *B60W 40/04* (2013.01);
(Continued)

(58) Field of Classification Search
CPC ......... B60W 2420/42; B60W 2550/22; B60W 2550/402; B60W 30/09; B60W 30/10;
(Continued)

(56) References Cited

U.S. PATENT DOCUMENTS 6,035,053 A * 3/2000 Yoshioka ........... B60K 31/0008
340/435
6,484,087 B2 * 11/2002 Shirai .................. B60W 30/16
180/169
(Continued)

FOREIGN PATENT DOCUMENTS

JP 2006195641 A * 7/2006
JP 2015184959 A 10/2015

*Primary Examiner* — Babar Sarwar
(74) *Attorney, Agent, or Firm* — Harness, Dickey & Pierce, P.L.C.

(57) ABSTRACT

A vehicle device is used for a vehicle and includes a data acquisition unit, a compensation unit, and an output unit. The data acquisition unit acquires data successively transmitted from outside a subject vehicle via communication. The compensation unit compensates a data loss resulting from unsuccessfully acquiring of data in the data acquisition unit by using data already acquired by the data acquisition unit and generates assistive data used for travel assistance of the subject vehicle. The compensation unit associates with the assistive data a compensation implementation value indicating an implementation of the compensation. The output unit outputs the assistive data associated with the compensation implementation value to a travel assistance device for performing the travel assistance when the compensation unit generates the assistive data by compensating the data loss. Accordingly, decrease of driver's reliability for travel assistance using data acquired through communication is restricted.

6 Claims, 5 Drawing Sheets

(51) Int. Cl.
*B60W 30/16* (2012.01)
*G08G 1/09* (2006.01)
*G08G 1/16* (2006.01)
*H04L 1/00* (2006.01)
*B60W 40/04* (2006.01)
*G08G 1/0967* (2006.01)

(52) U.S. Cl.
CPC .............. *G08G 1/09* (2013.01); *G08G 1/167* (2013.01); *H04L 1/00* (2013.01); *H04L 1/0033* (2013.01); *B60W 2420/42* (2013.01); *B60W 2550/22* (2013.01); *B60W 2550/402* (2013.01); *G08G 1/096775* (2013.01); *G08G 1/096791* (2013.01); *G08G 1/163* (2013.01); *G08G 1/164* (2013.01)

(58) Field of Classification Search
CPC ........ B60W 30/12; B60W 30/16; G08G 1/09; G08G 1/16; G08G 1/167; H04L 1/00; H04L 1/0033
See application file for complete search history.

(56) References Cited

U.S. PATENT DOCUMENTS

| | | | | |
|---|---|---|---|---|
| 6,721,659 | B2* | 4/2004 | Stopczynski | B60R 21/013 180/274 |
| 6,906,639 | B2* | 6/2005 | Lemelson | G01S 13/931 180/167 |
| 7,734,416 | B2* | 6/2010 | Yano | B60T 7/22 180/232 |
| 7,974,784 | B2* | 7/2011 | Moriizumi | B60R 21/013 340/435 |
| 8,571,786 | B2* | 10/2013 | Iwasaki | B60W 10/06 340/435 |
| 2001/0039472 | A1* | 11/2001 | Isogai | B60K 31/0008 701/96 |
| 2006/0190175 | A1 | 8/2006 | Moriizumi et al. | |
| 2007/0291647 | A1* | 12/2007 | Smith | H04L 49/90 370/237 |

* cited by examiner

VEHICLE DEVICE

CROSS REFERENCE TO RELATED APPLICATIONS

This application is a U.S. National Phase Application under 35 U.S.C. 371 of International Application No. PCT/JP2017/006450 filed on Feb. 22, 2017 and published in Japanese as WO/2017/159237 A1 on Sep. 21, 2017. This application is based on and claims the benefit of priority from Japanese Patent Application No. 2016-055972 filed on Mar. 18, 2016. The entire disclosures of all of the above applications are incorporated herein by reference.

TECHNICAL FIELD

The present disclosure relates to a vehicle device that processes data acquired through communication.

BACKGROUND ART

Patent Literature 1 discloses a technology that successively acquires vehicle data through communication, performs predetermined arithmetic processing on the acquired data, and generates output data to control a vehicle. Patent Literature 1 further discloses a technology that uses linear interpolation to interpolate lost data, if any, in the successively acquired data through the communication and generates output data to control a vehicle.

PRIOR ART LITERATURE

Patent Literature

Patent literature 1: JP 2015-184959 A

SUMMARY OF INVENTION

However, there should be a difference between the complemented data and successfully acquired data without loss even if the interpolation is performed against a loss of data acquired through the communication. The technology disclosed in Patent Literature 1 does not change the use of output data to control a vehicle regardless of whether the data interpolation is performed. There is a possibility that the vehicle cannot be controlled in accordance with an actual vehicle situation depending on the accuracy of interpolated data, and driver's reliability for the travel assistance is decreased.

It is an object of the present disclosure to provide a vehicle device capable of restricting the decrease of driver's reliability for the travel assistance using data acquired through communication.

According to an aspect of the present disclosure, a vehicle device is used for a vehicle and includes a data acquisition unit, a compensation unit, and an output unit. The data acquisition unit is configured to acquire data successively transmitted from outside a subject vehicle via communication. The compensation unit is configured to compensate a data loss resulting from unsuccessfully acquiring of data in the data acquisition unit by using data already acquired by the data acquisition unit and generate assistive data used for travel assistance of the subject vehicle. The compensation unit is further configured to associate with the assistive data a compensation implementation value indicating an implementation of the compensation. The output unit is configured to output the assistive data associated with the compensation implementation value to a travel assistance device for performing the travel assistance when the compensation unit generates the assistive data by compensating the data loss.

According to the aspect of the present disclosure, the compensation unit compensates a loss of data unsuccessfully acquired by the data acquisition unit to generate the assistive data. The assistive data is associated with the compensation implementation value and is output to the travel assistance device. The travel assistance device is capable of determining whether to use the assistive data for travel assistance of the vehicle, based on the compensation implementation value associated with the assistive data. Therefore, it is possible to restrict the assistive data inappropriate for the travel assistance from being used for the travel assistance, based on the compensation implementation value. As a result, it is possible to restrict the decrease of driver's reliability for the travel assistance.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
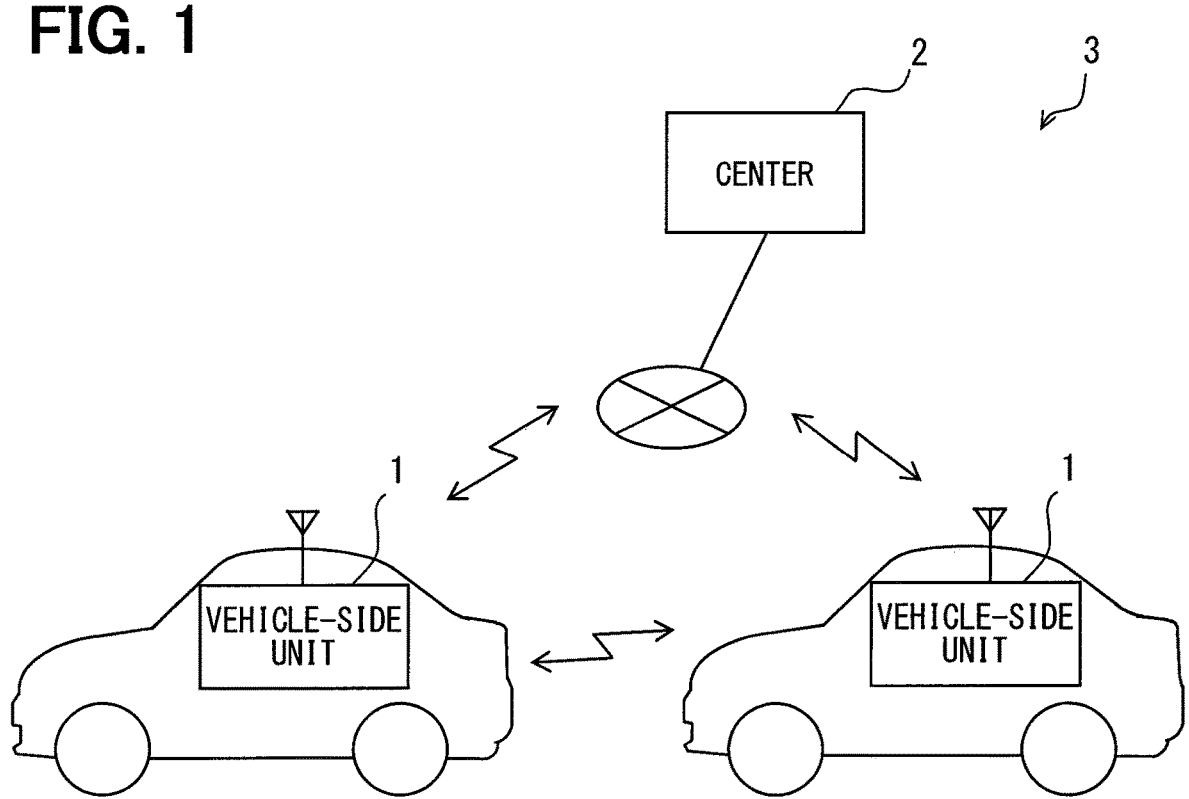
FIG. 1 is a diagram illustrating an example of a schematic configuration of a travel assistance system.

Embodiments and modifications for the disclosure will be described with reference to the accompanying drawings. The same reference numerals may be given to parts having the same functions illustrated in the drawings used to describe the embodiments and the modifications hitherto and the related description may be omitted for convenience sake. The parts given the same reference numerals may refer to the description in the other embodiments and/or modifications.

First Embodiment

<Schematic Configuration of a Travel Assistance System 3>

The description below explains a first embodiment of the present disclosure with reference to the accompanying drawings. As illustrated in FIG. 1, a travel assistance system 3 includes a vehicle-side unit 1 and a center 2. The vehicle-side unit 1 is mounted on each of a plurality of vehicles.

The vehicle-side unit 1 communicates with the vehicle-side unit 1 mounted on a nearby vehicle around a subject vehicle and communicates with the center 2. The center 2 is available as a server, for example. The center 2 acquires vehicle information transmitted from the vehicle-side unit 1 of a certain vehicle via a public telecommunication network and transfers the vehicle information to the vehicle-side unit 1 of another vehicle. The travel assistance system 3 allows the vehicle-side units 1 to directly communicate with each other or to indirectly communicate with each other via the center 2.

Direct communication between the vehicle-side units 1 (hereinafter referred to as inter-vehicle communication) may use a radio wave of 760 MHz band and may comply with the communication standard of WAVE (Wireless Access in Vehicular Environment). The inter-vehicle communication may use other frequency bands such as 2.4 GHz and 5.9 GHz for radio waves. The inter-vehicle communication may use communication standards other than WAVE.

Communication between the vehicle-side units 1 via the center 2 (hereinafter referred to as communication via the center) may use public telecommunication networks such as a mobile telephone network and the Internet. The center 2 manages a vehicle position of each vehicle by successively updating and storing the vehicle position contained in the vehicle information successively transmitted from the vehicle-side unit 1 of each vehicle. Suppose the center 2 acquires the vehicle information transmitted from the vehicle-side unit 1 of a certain vehicle. In this case, the communication via the center specifies nearby vehicles located around the vehicle based on the vehicle position contained in the vehicle information and the managed vehicle position of each vehicle and transfers the acquired vehicle information to the nearby vehicles. The center 2 may include one or more servers.

<Schematic Configuration of Vehicle-Side Unit 1>

Figure 2:
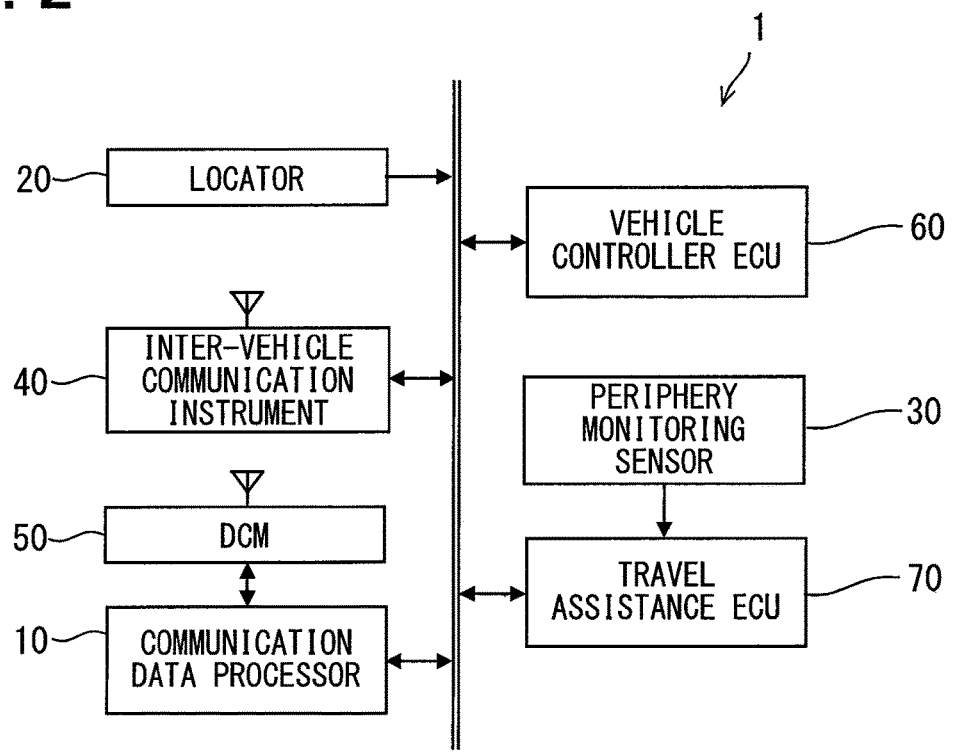
FIG. 2 is a diagram illustrating an example of a schematic configuration of a vehicle-side unit.

The description below explains a schematic configuration of the vehicle-side unit 1 with reference to FIG. 2. As illustrated in FIG. 2, the vehicle-side unit 1 includes a communication data processor 10, a locator 20, an inter-vehicle communication instrument 40, a DCM (Data Communication Module) 50, a vehicle controller ECU 60, and a travel assistance ECU 70. For example, the communication data processor 10, the locator 20, the inter-vehicle communication instrument 40, the vehicle controller ECU 60, and the travel assistance ECU 70 are connected to an in-vehicle LAN and can exchange information with each other through the communication. The foregoing is only an example. The DCM 50 may be connected to the in-vehicle LAN. The inter-vehicle communication instrument 40 may not be connected to the in-vehicle LAN but may be connected to the communication data processor 10.

The locator 20 includes a GNSS (Global Navigation Satellite System) receiver, an inertial sensor such as a 3D gyro sensor, and memory to store map data. The GNSS receiver receives positioning signals from a plurality of artificial satellites. The 3D gyro sensor includes a 3-axis gyro sensor and a 3-axis acceleration sensor, for example. The locator 20 measures vehicle positions of the subject vehicle by combining a positioning signal received by the GNSS receiver with a measurement result from the inertial sensor.

A periphery monitoring sensor 30 detects obstacles around the subject vehicle and pavement markings such as a lane line and a stop line around the subject vehicle. The periphery monitoring sensor 30 represents sensors such as a periphery monitoring camera to capture a predetermined range around the subject vehicle, a millimeter-wave radar or a sonar to transmit probe waves to a predetermined range around the subject vehicle, and LIDAR (Light Detection and Ranging/Laser Imaging Detection and Ranging). The periphery monitoring camera successively captures images and successively outputs the captured images as sensing information. Sensors such as the sonar, the millimeter-wave radar, and LIDAR to transmit probe waves successively output scanning results as sensing information based on a reception signal acquired when receiving a reflected wave reflecting off an obstacle. A plurality of types of the periphery monitoring sensors 30 may cover overlapping sensing ranges such that the periphery monitoring camera and the millimeter-wave radar sense the front of the subject vehicle.

The inter-vehicle communication instrument 40 is provided as a communication module that performs the inter-vehicle communication with the inter-vehicle communication instrument 40 of the vehicle-side unit 1 mounted on a nearby vehicle around the subject vehicle. The inter-vehicle communication instrument 40 includes a narrowband communication antenna and a narrowband transceiver. The narrowband communication antenna transmits and receives radio waves of frequency bands used for the inter-vehicle communication. The narrowband transceiver demodulates a signal received at the narrowband communication antenna and outputs the signal to the communication data processor 10. The narrowband transceiver modulates data input from the communication data processor 10 and outputs the data to the narrowband communication antenna. The data output to the narrowband communication antenna is transmitted from the narrowband communication antenna.

The DCM 50 is provided as a communication module used for telematics. The DCM 50 includes a wide area communication antenna and a wide area transceiver. The wide area communication antenna transmits and receives radio waves of frequency bands used for wireless communication with a base station of the public telecommunication network. The wide area transceiver demodulates a signal received at the wide area communication antenna and outputs the signal to the communication data processor 10. The wide area transceiver modulates data input from the communication data processor 10 and outputs the data to the wide area communication antenna. The data output to the wide area communication antenna is transmitted from the wide area communication antenna. The communication module used for telematics has been described as an example of the communication module used for the communication via the center. However, the communication module is not limited to the one used for telematics if the communication module can communicate with the center 2 via the public telecommunication network.

The vehicle controller ECU 60 is available as an electronic control device that performs acceleration and deceleration control and/or steering control over the subject vehicle. The vehicle controller ECU 60 includes a steering ECU to perform the steering control, and a power unit control ECU and a brake ECU to perform the acceleration and deceleration. The vehicle controller ECU 60 acquires detection signals output from sensors such as an accelerator position sensor, a brake pedal force sensor, a steering angle sensor, a vehicle speed sensor, and an acceleration sensor mounted on the subject vehicle. The vehicle controller ECU 60 outputs control signals to travel control devices such as an electronically controlled throttle, a brake actuator, and an EPS (Electric Power Steering) motor. The vehicle controller ECU 60 can output detection signals from the above-mentioned sensors to the in-vehicle LAN.

The travel assistance ECU 70 is configured as a computer including a CPU, volatile memory, nonvolatile memory, I/O, and a bus connecting these components. The travel assistance ECU 70 performs various processes by executing a control program stored in the nonvolatile memory.

For example, the travel assistance ECU 70 recognizes a travel environment for the subject vehicle based on the vehicle information about the nearby vehicle around the subject vehicle acquired from the communication data processor 10, the vehicle position and the map data for the subject vehicle acquired from the locator 20, and the sensing information acquired from the periphery monitoring sensor 30. Moreover, the travel assistance ECU 70 controls the vehicle controller ECU 60 based on the recognized travel environment to provide the travel assistance such as assistance and/or replacement of driving manipulation by a driver. The travel assistance ECU 70 will be described in detail later. One or more IC chips as hardware may configure all or part of the functions performed by the travel assistance ECU 70.

The communication data processor 10 is configured as a computer including a CPU, volatile memory, nonvolatile memory, I/O, and a bus connecting these components. The communication data processor 10 performs various processes by executing a control program stored in the nonvolatile memory. One or more IC chips as hardware may configure all or part of the functions performed by the communication data processor 10.

For example, the communication data processor 10 generates vehicle information containing a state quantity concerning the subject vehicle travel based on the sensing information acquired from various sensors detecting state quantities concerning the subject vehicle travel and based on vehicle positions of the subject vehicle acquired from the locator 20. The communication data processor 10 allows the inter-vehicle communication instrument 40 or the DCM 50 to transmit the generated vehicle information.

Various sensors such as a vehicle speed sensor, an acceleration sensor, and a gyro sensor detect state quantities concerning the subject vehicle travel. The sensing information acquired from these sensors includes a speed, an acceleration, and an orientation of the subject vehicle, for example. The vehicle information includes a time stamp indicating the time to generate the vehicle information and identification information to identify an origin of transmitting the vehicle information in addition to the vehicle position, the speed, the acceleration, and the orientation of the subject vehicle as the state quantity concerning the subject vehicle travel. The identification information is available as a vehicle ID of the subject vehicle, for example. An available time stamp may indicate the time to detect each state quantity concerning the subject vehicle travel.

Suppose the inter-vehicle communication instrument 40 transmits the vehicle information. In this case, the communication data processor 10 uses the inter-vehicle communication to broadcast the vehicle information to the nearby vehicle around the subject vehicle at a predetermined transmission cycle. The communication data processor 10 transmits vehicle information common to the vehicle information broadcast by the inter-vehicle communication to the center 2 via a base station and a public telecommunication network at a predetermined transmission cycle. The common vehicle information in this context just needs to ensure the common content of the vehicle information and may differ in the content of a header other than the content of the vehicle information.

The inter-vehicle communication instrument 40 uses the inter-vehicle communication to receive the vehicle information about the nearby vehicle from the nearby vehicle around the subject vehicle. The DCM 50 uses the communication via the center 2 to receive the vehicle information about the nearby vehicle. The communication data processor 10 processes and outputs these pieces of vehicle information to the travel assistance ECU 70. The description below explains a process (hereinafter referred to as a reception-related process) the communication data processor 10 performs on the received vehicle information about the nearby vehicle.

<Schematic Configuration of Reception-Related Process Performed by Communication Data Processor 10>

Figure 3:
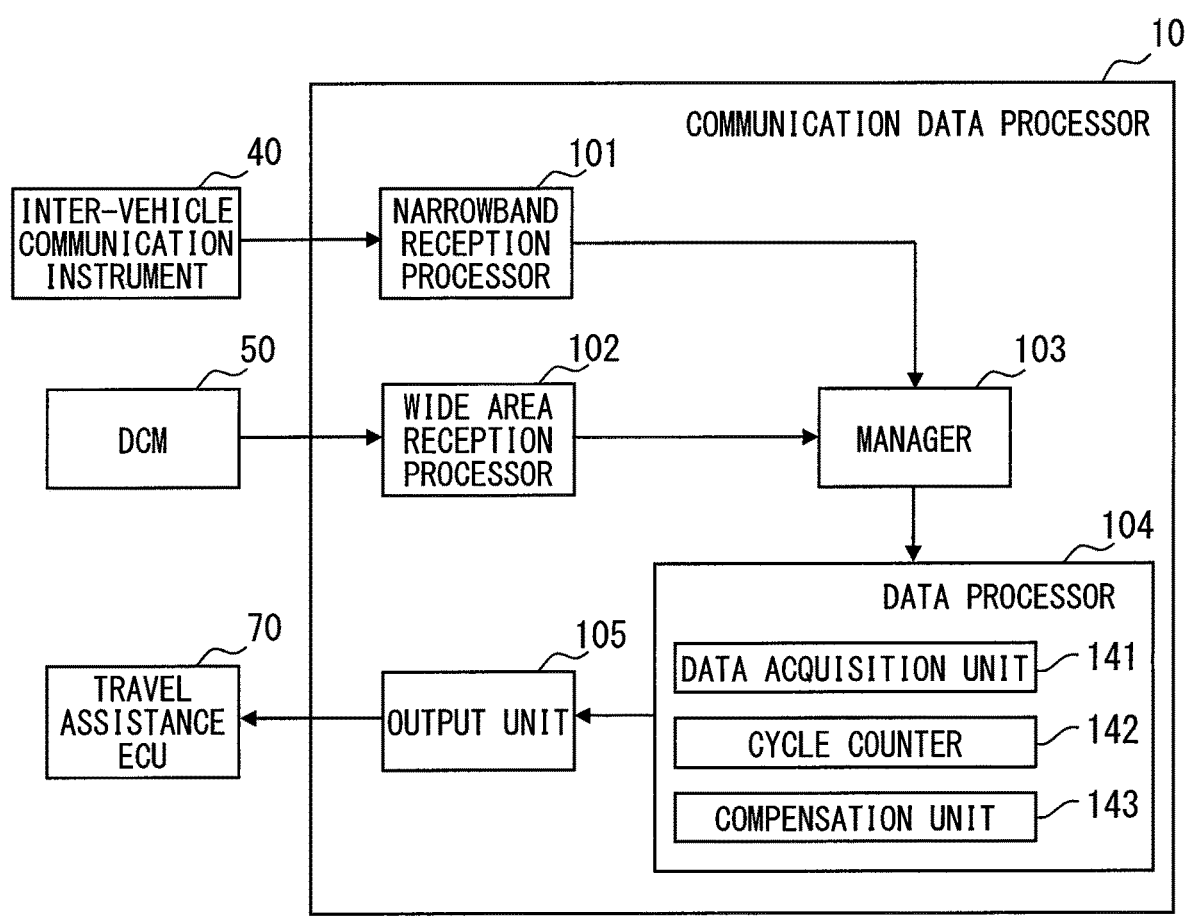
FIG. 3 is a diagram illustrating an example of a schematic configuration of a reception-related process in a communication data processor.

The description below explains a schematic configuration of the reception-related process performed by the communication data processor 10 with reference to FIG. 3. The communication data processor 10 includes function blocks illustrated in FIG. 3 to provide functions concerning the reception-related process. The communication data processor 10 is comparable to a vehicle device. As illustrated in FIG. 3, the communication data processor 10 includes functions blocks such as a narrowband reception processor 101, a wide area reception processor 102, a manager 103, a data processor 104, and an output unit 105.

The narrowband reception processor 101 successively acquires the vehicle information about the nearby vehicle successively received by the inter-vehicle communication instrument 40. The narrowband reception processor 101 successively outputs the received vehicle information about the nearby vehicle to the manager 103. The wide area reception processor 102 successively acquires the vehicle information about the nearby vehicle successively received by the DCM 50. The wide area reception processor 102 successively outputs the acquired vehicle information about the nearby vehicle to the manager 103.

The manager 103 temporarily stores the vehicle information about the nearby vehicle acquired by the narrowband reception processor 101 and the wide area reception processor 102 in association with the vehicle ID of the nearby vehicle in the volatile memory. The vehicle information about the nearby vehicle around the subject vehicle is thereby managed by making a distinction between vehicles.

The manager 103 stores the vehicle information about the nearby vehicle in the volatile memory by comparing the already stored vehicle information about the nearby vehicle and the vehicle information to be stored. The manager 103 discards the duplicate vehicle information without storing it if the same vehicle information is already stored. The same vehicle information in this context signifies the vehicle information ensuring the vehicle ID and the time stamp indicating the generation time same as those of the other vehicle information. The common vehicle information may be transmitted via the types of communication paths for the inter-vehicle communication and the communication via the center. In this case, the volatile memory stores the vehicle information output from the narrowband reception processor 101 or the wide area reception processor 102, whichever acquires the vehicle information first.

The manager 103 successively outputs the vehicle information stored in the volatile memory to the data processor 104. As an example, the vehicle information already stored in the volatile memory may be read and output each time the duplicate vehicle information is discarded without being stored. In this case, the vehicle information read from the volatile memory is erased from the volatile memory. The communication data processor 10 may acquire the common vehicle information through one of the inter-vehicle communication and the communication via the center. This vehicle information may be read along with the later acquired vehicle information when read from the volatile memory and may be output to the data processor 104. Namely, the example according to the first embodiment non-periodically inputs the vehicle information to the data processor 104.

The data processor 104 includes a data acquisition unit 141, a cycle counter 142, and a compensation unit 143. The output unit 105 successively outputs the vehicle information successively transmitted from the data processor 104 to the travel assistance ECU 70. The description below explains the data acquisition unit 141, the cycle counter 142, and the compensation unit 143 included in the data processor 104.

The data acquisition unit 141 acquires the vehicle information successively input from the manager 103. This vehicle information is attributed to the nearby vehicle and is successively transmitted from the outside of the subject vehicle through communication. The data acquisition unit 141 may successively transmit the vehicle information successively input from the manager 103 to the output unit 105.

The cycle counter 142 increments a count value by 1 at a predetermined cycle each time the manager 103 inputs the vehicle information to the data acquisition unit 141. The cycle counter 142 resets the count value to 0 when the manager 103 inputs the next vehicle information to the data acquisition unit 141. The predetermined cycle can be settled optionally. The cycle counter 142 keeps a count value set to 0 when the manager 103 continuously inputs the vehicle information to the data acquisition unit 141 at an interval shorter than the predetermined cycle.

The count value is incremented by one when no vehicle information is input to the data acquisition unit 141 after a lapse of the predetermined cycle, namely, a loss of vehicle information (hereinafter referred to as a data loss) occurs. The count value is incremented by the number of data losses when the data loss occurs more than once, namely, when no vehicle information is input to the data acquisition unit 141 after repeating the predetermined cycle more than once. A timer circuit may measure the predetermined cycle.

When a data loss occurs, the compensation unit 143 generates the vehicle information corresponding to the data loss using the vehicle information already acquired by the data acquisition unit 141 to compensate the data loss. The compensated vehicle information is comparable to assistive data. The volatile memory may temporarily store the chronologically organized multiple vehicle information to be used more than once already acquired by the data acquisition unit 141 in order to use the vehicle information already acquired by the data acquisition unit 141 for the compensation. The vehicle information to be used more than once stored in the volatile memory may be erased from the least recent one each time the data acquisition unit 141 acquires new vehicle information. As an example, the linear interpolation can generate the vehicle information corresponding to the data loss based on the chronologically organized vehicle information to be used more than once.

The compensation unit 143 compensates the vehicle information corresponding to the data loss and transmits the compensated vehicle information to the output unit 105 while the compensated vehicle information is associated with the count value counted by the cycle counter 142. The count value is not associated with uncompensated vehicle information but is associated with the compensated vehicle information. The count value is therefore comparable to a compensation implementation value indicating an implementation of the compensation. The cycle counter 142 increments the count value as a data loss continues after the vehicle information is input to the data acquisition unit 141. A large count value is therefore assigned to the vehicle information that is used to compensate a data loss chronologically far from the time the vehicle information is input to the data acquisition unit 141.

Suppose the vehicle information compensates a data loss that is chronologically far from the time to input the vehicle information to the data acquisition unit 141. This vehicle information is chronologically distant from the vehicle information to be used for the compensation, easily causes an error, and decreases the compensation accuracy. The compensated vehicle information assigned a large count value can be assumed to decrease the compensation accuracy. The count value is therefore comparable to a compensation accuracy value indicating the compensation accuracy.

Figure 4:
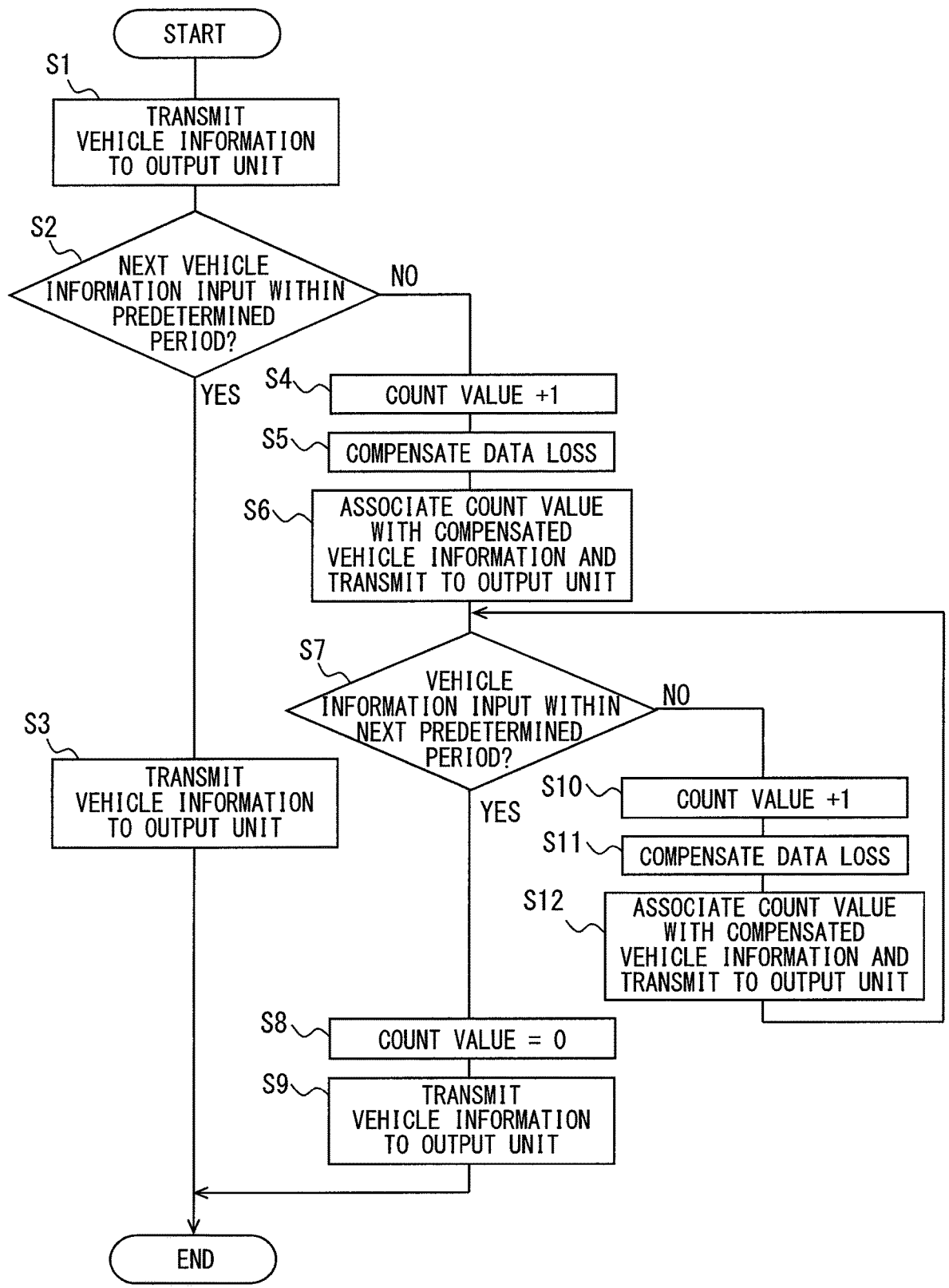
FIG. 4 is a flowchart illustrating an example of a process flow in a data processor.

The description below explains an example of the process flow in the data processor 104 with reference to a flowchart in FIG. 4. The flowchart in FIG. 4 starts when the vehicle information is input to the data acquisition unit 141, for example.

At step S1, the data acquisition unit 141 transmits the vehicle information input from the manager 103 to the output unit 105 and allows the output unit 105 to output the vehicle information to the travel assistance ECU 70. At step S2, when the next vehicle information is input within a predetermined period from the time when the vehicle information is input to the data acquisition unit 141 at S1 (YES at S2), the process proceeds to step S3. When the next vehicle information is not input within the predetermined period (NO at S2), the process proceeds to step S4. At step S3, the data acquisition unit 141 transmits the next vehicle information input at S2 to the output unit 105 and terminates the process. The vehicle information transmitted to the output unit 105 is output to the travel assistance ECU 70.

The process proceeds to step S4 when the next vehicle information is not input within the predetermined period at step S2. At step S4, the cycle counter 142 increments the count value by 1. The default count value is 0. At step S5, the compensation unit 143 compensates the vehicle information corresponding to a data loss within the predetermined period at S2. At step S6, the compensation unit 143 associates the count value acquired at S4 with the vehicle information compensated at S5 and transmits the vehicle information to the output unit 105. The vehicle information associated with the count value is transmitted to the output unit 105 and is then output to the travel assistance ECU 70.

At step S7, when the vehicle information is input within the predetermined period next to the predetermined period at S2 (YES at S7), the process proceeds to step S8. When the vehicle information is not input within the next predetermined period (NO at S7), the process proceeds to step S10. At step S8, the cycle counter 142 resets the count value to 0. At step S9, the data acquisition unit 141 transmits the vehicle information input at S7 to the output unit 105 and terminates the process.

The process proceeds to step S10 when the vehicle information is not input within the next predetermined period at step S7. At step S10, the cycle counter 142 further increments the count value by 1. At step S11, the compensation unit 143 compensates the vehicle information corresponding to the data loss within the most recent predetermined period at S7. At step S12, the compensation unit 143 associates the count value acquired at S10 with the vehicle information compensated at S11 and transmits the vehicle information to the output unit 105.

The description below explains an example of compensating a data loss and associating a count value with the compensated vehicle information with reference to FIGS.

Figure 5A:
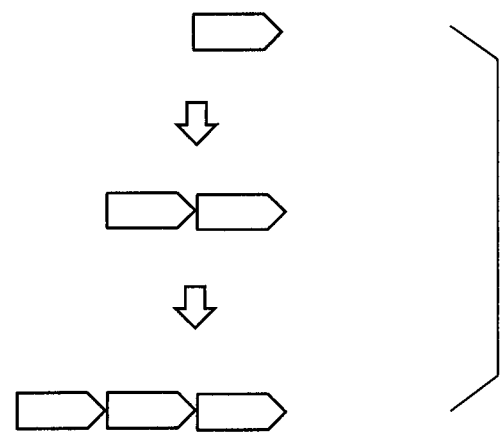
FIG. 5A is a schematic diagram illustrating an example of interpolation applied to data loss and allocation of a count value to interpolated vehicle information.
Figure 5B:
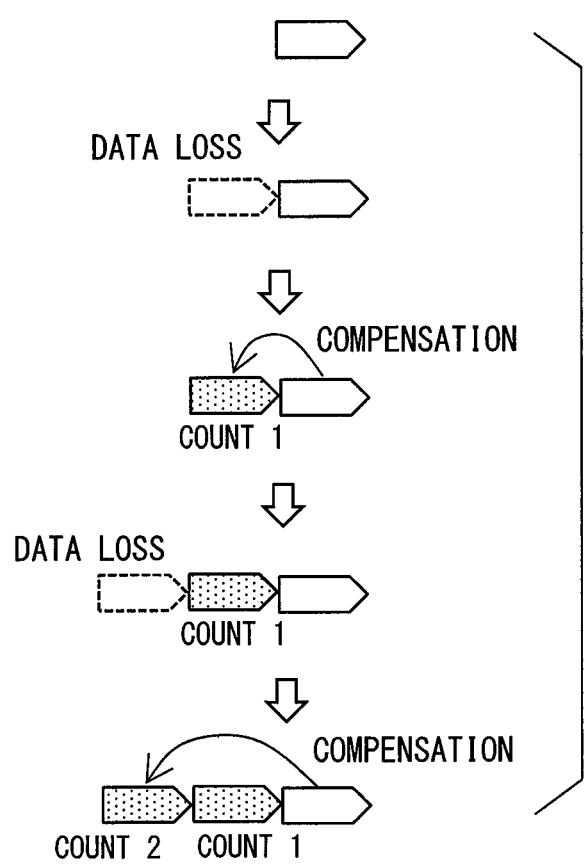
FIG. 5B is a schematic diagram illustrating an example of interpolation applied to data loss and allocation of a count value to interpolated vehicle information.

5A and 5B. FIG. 5A illustrates an example where no data loss occurs. FIG. 5B illustrates an example where a data loss occurs successively.

When no data loss occurs as illustrated in FIG. 5A, the vehicle information is transmitted to the output unit 105 with no count value associated each time the vehicle information is input to the data acquisition unit 141 within the predetermined period. When a data loss occurs as illustrated in FIG. 5B, the vehicle information already acquired by the data acquisition unit 141 is used to compensate the vehicle information corresponding to the data loss. The vehicle information is associated with the count value (count "1" according to the example in FIG. 5B) and is transmitted to the output unit 105. When a data loss occurs successively, the vehicle information already acquired by the data acquisition unit 141 is used to compensate the vehicle information corresponding to the data loss. The vehicle information is associated with the count value (count "2" according to the example in FIG. 5B) corresponding to the number of successive data losses and is transmitted to the output unit 105.

When no data loss occurs as above, the data processor 104 transmits the vehicle information successively input from the manager 103 to the output unit 105. When a data loss occurs, the data processor 104 compensates the data loss and transmits the compensated vehicle information associated with the count value to the output unit 105.

The data processor 104 may perform arithmetic processing other than the compensation for data losses. For example, the data processor 104 may sort the vehicle information based on the time stamp or generate data used for the travel assistance in the travel assistance ECU 70 based on the vehicle information and transmit the data to the output unit 105. An example is to generate a target value used for the travel assistance in the travel assistance ECU 70 based on the vehicle information and transmit the target value to the output unit 105.

<Schematic Configuration of Travel Assistance ECU 70>

Figure 6:
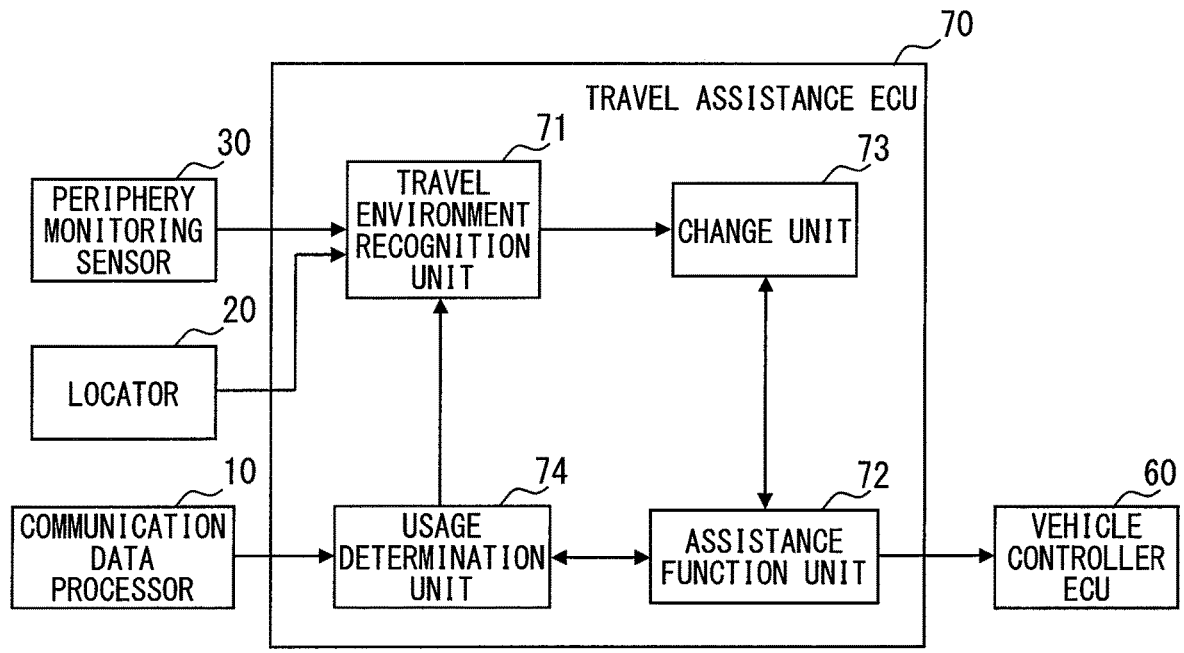
FIG. 6 is a diagram illustrating an example of a schematic configuration of a travel assistance ECU.

The schematic configuration of the travel assistance ECU 70 will be described with reference to FIG. 6. As illustrated in FIG. 6, the travel assistance ECU 70 includes a travel environment recognition unit 71, an assistance function unit 72, a change unit 73, and a usage determination unit 74. The travel assistance ECU 70 is comparable to a travel assistance device.

The travel environment recognition unit 71 recognizes a travel environment of the subject vehicle based on the vehicle information about the nearby vehicle acquired from the communication data processor 10, the vehicle position of the subject vehicle and the map data acquired from the locator 20, and the sensing information acquired from the periphery monitoring sensor 30. These pieces of information are used to recognize shapes of objects around the subject vehicle and traveling states of the subject vehicle, for example. The travel environment recognition unit 71 even recognizes the travel environment outside the sensing range of the periphery monitoring sensor 30 by using the vehicle information about the nearby vehicle acquired from the communication data processor 10 as well.

The assistance function unit 72 includes an automatic driving function to provide the travel assistance such as assistance and/or replacement of driving manipulation by a driver by allowing the vehicle controller ECU 60 to control at least one of acceleration, braking, and steering of the subject vehicle based on the travel environment of the subject vehicle recognized by the travel environment recognition unit 71. As examples of the automatic driving function, an ACC (Adaptive Cruise Control) function adjusts a driving force and a braking force and thereby controls a travel speed of the subject vehicle so as to maintain a targeted inter-vehicular distance in relation to a leading vehicle. An LKA (Lane Keeping Assist) function generates a steering force in the direction to prevent approach to a lane line and thereby allows vehicle HV to travel while maintaining a traveling lane. An LCA (Lane Change Assist) function allows vehicle HV to automatically move to the adjacent lane. An AEB (Autonomous Emergency Braking) function generates a braking force based on the forward sensing information and thereby forcibly decelerates the subject vehicle. There are also available functions such as controlling acceleration, deceleration, and steering so as to travel along a recommended vehicular swept path or automatically pulling over a vehicle to the shoulder during an emergency. These are only examples. The automatic driving function may include the other functions.

According to the first embodiment, the travel environment recognition unit 71 recognizes the travel environment depending on the automatic driving function. For example, the LCA function recognizes the travel environment at the rear side from the front of the subject vehicle and the side thereof corresponding to the lane to be changed.

The automatic driving function may be too insufficient to be performed according to a result of recognizing the travel environment from the travel environment recognition unit 71, for example. In such a case, the change unit 73 changes the driving manipulation to manual mode instead of using the assistance function unit 72. An information provision device provides a driver with the information notifying that the automatic driving function is not performed and the driving manipulation needs to be changed to manual mode.

The usage determination unit 74 determines whether to use the vehicle information for the travel assistance, based on the count value associated with the vehicle information about the nearby vehicle output from the output unit 105 of the communication data processor 10.

In detail, the usage determination unit 74 determines that the vehicle information associated with no count value is used for travel assistance. The vehicle information is output to the travel environment recognition unit 71. The vehicle information output to the travel environment recognition unit 71 is used for the travel environment recognition unit 71 to recognize the travel environment of the subject vehicle. The recognized travel environment is used for the assistance function unit 72 to provide the subject vehicle with the travel assistance.

The usage determination unit 74 determines whether the vehicle information associated with the count value is used for the travel assistance depending on the count value. An example is as follows. Suppose each automatic driving function has a predetermined threshold value for count values. A table stored in the nonvolatile memory or a program may contain the correspondence between the automatic driving function and the threshold value. When the count value exceeds the threshold value, the usage determination unit 74 determines that the vehicle information associated with the count value is not used to recognize the travel environment used for the automatic driving function corresponding to the threshold value. The travel environment recognition unit 71 is prevented from using this vehicle information to recognize this travel environment.

A smaller threshold value is assigned to the automatic driving function that requires higher accuracy to recognize the travel environment. Namely, the usage determination unit 74 determines to preferentially avoid using the vehicle information assigned a larger count value indicating the compensation accuracy for the travel assistance that requires more highly accurate vehicle information to be used for the travel assistance. For example, the automatic driving function such as the LCA function requires high positional accuracy. This automatic driving function is determined not to use the vehicle information that is assumed to indicate a large count value and low compensation accuracy. The assistance function unit 72 does not perform the automatic driving function that is too insufficient to be performed according to a result of recognizing the travel environment without using vehicle information about the nearby vehicle. The assistance function unit 72 performs the automatic driving function that can be sufficiently performed according to a result of recognizing the travel environment without using vehicle information about the nearby vehicle.

According to the configuration of the first embodiment, the communication data processor 10 may be able to one or more common vehicle information transmitted via a plurality of types of communication paths. In this case, the output unit 105 outputs the acquired vehicle information to the travel assistance ECU 70. It is possible to avoid a data loss in which the vehicle information is not acquired compared to a case of transmitting the vehicle information via a single communication path.

Suppose a data loss occurs according to the configuration of the first embodiment. Even in such a case, the compensation unit 143 compensates the data loss to generate the vehicle information about the nearby vehicle, associates the vehicle information with a count value indicating the compensation implementation and the compensation accuracy, and outputs the vehicle information to the travel assistance ECU 70. The count value associated with the vehicle information about the nearby vehicle may be assumed not to satisfy the accuracy required for the travel assistance. In such a case, the travel assistance ECU 70 does not use this vehicle information for this travel assistance. It is therefore possible to avoid using the vehicle information that is generated by compensating a data loss but is not suitable for the travel assistance. As a result, it is possible to restrict the travel assistance from providing vehicle control inappropriate for an actual vehicle situation and restrict the decrease of driver's reliability for the travel assistance.

Second Embodiment

The first embodiment provides the configuration to avoid using the vehicle information for the travel assistance depending on count values associated with the vehicle information about the nearby vehicle, but is not limited thereto. For example, there may be a configuration (hereinafter referred to as a second embodiment) that changes automation levels of the automatic driving depending on count values associated with the vehicle information about the nearby vehicle.

The description below explains the second embodiment of the present disclosure with reference to the accompanying drawings. The travel assistance system 3 according to the second embodiment equals the travel assistance system 3 according to the first embodiment except that the travel assistance ECU 70 is replaced by a travel assistance ECU 70a.

Figure 7:
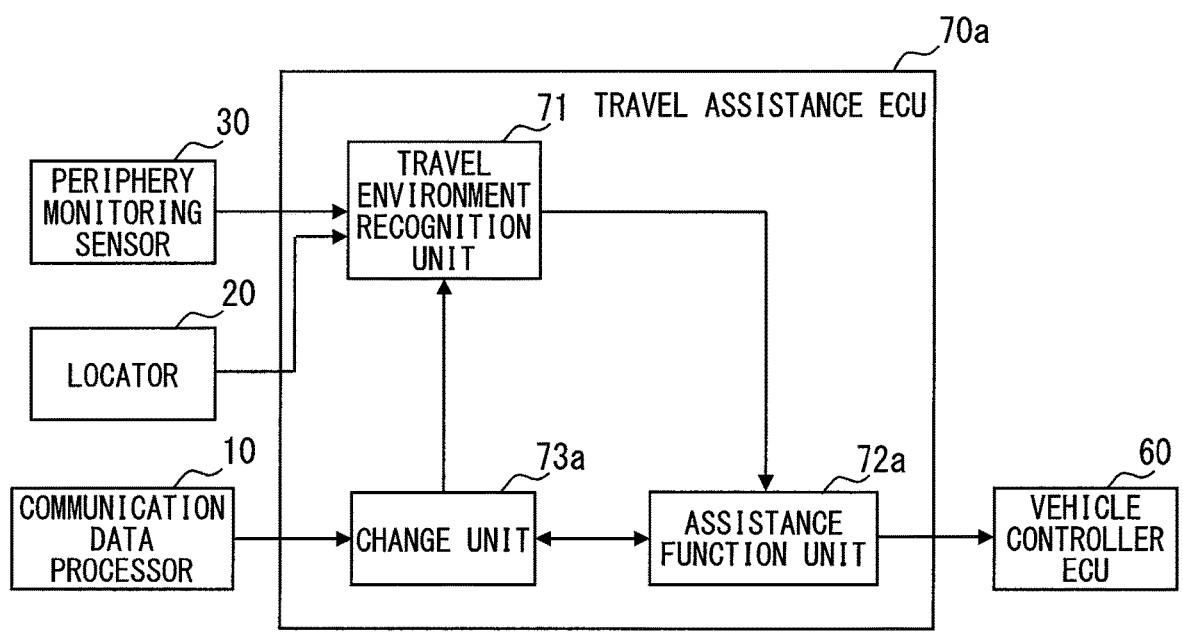
FIG. 7 is a diagram illustrating an example of a schematic configuration of a travel assistance ECU.

The travel assistance ECU 70a will be described with reference to FIG. 7. As illustrated in FIG. 7, the travel assistance ECU 70a includes the travel environment recognition unit 71, an assistance function unit 72a, and a change unit 73a. The travel assistance ECU 70a equals the travel assistance ECU 70 according to the first embodiment except that the usage determination unit 74 is not included and the assistance function unit 72 and the change unit 73 are replaced by the assistance function unit 72a and the change unit 73a. The travel assistance ECU 70a is also comparable to the travel assistance device.

The assistance function unit 72a equals the assistance function unit 72 except that the assistance function unit 72a can change automation levels of the automatic driving to automatically control at least one of acceleration, braking, and steering of the subject vehicle. The assistance function unit 72a can change automation levels of the automatic driving (hereinafter referred to simply as automation levels) at a plurality of stages.

The second embodiment describes examples of automation level 0 (No-Automation), automation level 1 (Function-specific Automation), automation level 2 (Combined Function Automation), automation level 3 (Limited Self-Driving Automation), and automation level 4 (Full Self-Driving Automation) according to the automation level classification defined by NHTSA (National Highway Traffic Safety Administration).

Automation level 0 corresponds to a stage where a driver is solely responsible for manipulating a main vehicle control system including a brake, a steering system, a throttle, and a driving force of the subject vehicle without automation. In other words, the stage does not perform automatic driving to avoid automatic control over acceleration, braking, or steering. The stage signifies manual operation.

Automation level 1 corresponds to a stage that independently performs one automated function in the main vehicle control system of the subject vehicle. In other words, the stage automates a specific function to automatically control one of acceleration, braking, and steering. The stage of automating a specific function independently performs an ACC function, an LKA function, or an AEB function, for example.

Automation level 2 corresponds to a stage that complexly performs a function resulting from automating one of the main vehicle control systems for the subject vehicle. In other words, the stage automates a complex function to automatically control more than one of acceleration, braking, and steering. The stage of automating the complex function performs the ACC function and the LKA function together or the ACC function and the LCA function together, for example.

Automation level 3 corresponds to a stage that automates all the main vehicle control systems for the subject vehicle and permits a driver the driving manipulation only when a traffic situation changes to force the driver to drive. In other words, the stage provides semi-automatic driving that automatically controls all of acceleration, braking, and steering unless there is an emergency.

Automation level 4 corresponds to a stage that automates all the main vehicle control systems for the subject vehicle and eliminates the necessity for the driver to perform driving manipulation at any time during traveling. In other words, the stage provides full automatic driving that automatically controls all of acceleration, braking, and steering even during an emergency. Automation levels 1 through 4 may signify the stages of automatic driving capable of automatically controlling at least any one of acceleration, braking, and steering.

The classification of automation levels is not limited to the above-mentioned example. Another example of classification may include a stage of manual operation, a stage of automatically performing part of driving manipulation, and a stage of automatically performing all the driving manipulation. Yet another example of classification may include a stage of automatic driving to automatically perform at least any one of acceleration, braking, and steering and a stage of manual operation to perform the same.

The change unit 73a changes the automation level of an automatic driving performed by using the vehicle information depending on the count value associated with the vehicle information about the nearby vehicle output from the output unit 105 of the communication data processor 10. For example, a threshold value may be predetermined for each automation level of the automatic driving. The automation level may remain unchanged if the count value is smaller than the threshold value for the current automation level. The automation level may be decreased if the count value is larger than or equal to the threshold value.

The above-mentioned threshold value can be settled based on the accuracy of the vehicle information about the nearby vehicle. This accuracy is required correspondingly to the automation level. The information provision device provides the driver with information about changing the automation level.

According to the configuration of the second embodiment, the travel assistance ECU 70a decreases the automation level of the automatic driving when the count value associated with the vehicle information about the nearby vehicle is estimated to dissatisfy the accuracy required from the automation level of the currently active automatic driving. It is therefore possible to avoid performing the automatic driving at an inappropriate automation level through the use of the vehicle information generated by compensating the data loss. As a result, it is possible to restrict the automatic driving from providing vehicle control inappropriate for an actual vehicle situation and restrict the decrease of driver's reliability for the travel assistance.

The change unit 73a may decrease the automation level for the automatic driving when a count value is associated with the vehicle information about the nearby vehicle compared to the case where no count value is associated with the vehicle information about the nearby vehicle. Namely, the change unit 73a may decrease the automation level for the automatic driving when a compensation implementation value is associated with the vehicle information about the nearby vehicle compared to the case where no compensation implementation value is associated with the vehicle information about the nearby vehicle.

(First Modification)

The above-mentioned embodiment non-periodically inputs the vehicle information to the data processor 104, but is not limited thereto. For example, the vehicle information may be periodically input to the data processor 104.

(Second Modification)

The above-mentioned embodiment uses count values counted by the cycle counter 142 as the compensation implementation value and the compensation accuracy value, but is not limited thereto. For example, other values may be used if the values are capable of representing the compensation implementation and the compensation accuracy.

(Third Modification)

The above-mentioned embodiment associates the compensation accuracy value with the vehicle information compensated as a data loss, but is not limited thereto. For example, the same value may be allocated to the compensated vehicle information to provide the compensation implementation value regardless of the number of data losses, if occurring successively. However, the compensation accuracy value may not be allocated.

(Fourth Modification)

The above-mentioned embodiment performs the compensation in response to occurrence of a data loss by using the vehicle information already acquired by the data acquisition unit 141 before occurrence of the data loss, but is not limited thereto. For example, the compensation may be performed in response to occurrence of a data loss by using the vehicle information already acquired by the data acquisition unit 141 before occurrence of the data loss and the vehicle information acquired by the data acquisition unit 141 after occurrence of the data loss. Also in this case, the compensation accuracy value may be allocated to represent the decreased compensation accuracy in accordance with the chronological distance from data acquired before or after a data loss occurs. The compensation implementation value may be allocated without allocating the compensation accuracy value.

(Fifth Modification)

According to the above-mentioned embodiments, plural types of communication paths transmit the common vehicle information to the communication data processor 10, but not limited thereto. Only one type of communication path may be used, for example.

(Sixth Modification)

The above-mentioned embodiment provides the communication data processor 10 separately from communication modules such as the inter-vehicle communication instrument 40 and the DCM 50, but is not limited thereto. For example, the communication data processor 10 may be integrated with the above-mentioned communication modules.

(Seventh Modification)

The above-mentioned embodiment provides the communication data processor 10 separately from the travel assistance ECU 70 or 70a, but is not limited thereto. For example, the communication data processor 10 may be integrated with the travel assistance ECU 70 or 70a.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

The invention claimed is:

1. A vehicle device used for a vehicle, comprising:
a processor and memory configured to:
acquire data successively transmitted from outside a subject vehicle via communication;
perform a compensation of a data loss resulting from unsuccessfully acquiring of data by using data already acquired, generate assistive data used for travel assistance of the subject vehicle, and associate with the assistive data a compensation implementation value indicating an implementation of the compensation; and
output the assistive data associated with the compensation implementation value to a travel assistance device for performing the travel assistance when the processor generates the assistive data by compensating the data loss.

2. The vehicle device according to claim 1,
wherein the processor is further configured to associate with the assistive data a compensation accuracy value as the compensation implementation value, the compensation accuracy value indicating an accuracy of the compensation, and wherein, when the data loss occurs successively, the processor is further configured to associate with the assistive data a value indicating that the accuracy of the compensation is decreased as the assistive data is generated by compensating the data loss chronologically distant from the already acquired data.

3. The vehicle device according to claim 2, further comprising:
the travel assistance device,
wherein the travel assistance device includes:
a second processor configured to perform the travel assistance and
determine whether to use the assistive data for the travel assistance based on the compensation accuracy value associated with the assistive data, and
wherein the second processor uses, for the travel assistance, the assistive data determined to be used for the travel assistance and does not use, for the travel assistance, the assistive data determined not to be used for the travel assistance.

4. The vehicle device according to claim 2, further comprising:
the travel assistance device,
wherein the travel assistance device includes:
a second processor configured to provide the travel assistance by performing automatic driving to automatically control at least one of acceleration, braking, and steering and
change an automation level of the automatic driving, and
wherein the second processor changes the automation level of the automatic driving using the assistive data based on the compensation accuracy value associated with the assistive data.

5. The vehicle device according to claim 1, further comprising:
the travel assistance device,
wherein the travel assistance device includes:
a second processor and memory configured to perform the travel assistance and
determine whether to use the assistive data for the travel assistance based on the compensation implementation value associated with the assistive data, and
wherein the second processor uses, for the travel assistance, the assistive data determined to be used for the travel assistance and does not use, for the travel assistance, the assistive data determined not to be used for the travel assistance.

6. The vehicle device according to claim 1,
wherein the processor is further configured to acquire common data successively transmitted from outside the subject vehicle via plural types of communication paths, and
wherein the processor is further configured to perform a compensation of a data loss by using common data already acquired, the data loss resulting from unsuccessfully acquiring of common data from any of the plural types of communication paths.

* * * * *